United States Patent
Fleury, Jr. et al.

(10) Patent No.: US 6,691,732 B2
(45) Date of Patent: Feb. 17, 2004

(54) HYDRANT SECURITY DEVICE

(75) Inventors: Leo W. Fleury, Jr., North Smithfield, RI (US); Mikail German, Johnson, RI (US); Ken Clark, Oreana, IL (US)

(73) Assignee: Mueller International, Smithfield, RI (US)

(*) Notice: Subject to any disclaimer, the term of this patent is extended or adjusted under 35 U.S.C. 154(b) by 0 days.

(21) Appl. No.: 10/360,687

(22) Filed: Feb. 7, 2003

(65) Prior Publication Data

US 2003/0150488 A1 Aug. 14, 2003

Related U.S. Application Data

(60) Provisional application No. 60/354,491, filed on Feb. 8, 2002.

(51) Int. Cl.[7] .......................... F16K 35/06; F16K 35/10; E03B 9/06
(52) U.S. Cl. ........................ 137/296; 70/164; 70/165; 70/178; 70/180; 137/382; 137/385; 220/724; 220/725; 220/726; 248/551; 248/552
(58) Field of Search ................. 137/272, 296, 137/371, 377, 381, 382, 385; 220/214, 724, 725, 726, 730; 70/158, 164, 165, 178, 180, 231, 232, DIG. 57; 248/551, 552

(56) References Cited

U.S. PATENT DOCUMENTS

| | | | | |
|---|---|---|---|---|
| 2,118,233 A | * | 5/1938 | Ruggio | 137/296 |
| 2,699,176 A | * | 1/1955 | Ucciardi | 137/296 |
| 3,379,209 A | * | 4/1968 | Spiselman | 137/296 |
| 4,182,361 A | * | 1/1980 | Oakey | 137/296 |
| 4,566,481 A | * | 1/1986 | Leopold, Jr. et al. | 137/296 |
| 4,736,765 A | * | 4/1988 | Campbell | 137/296 |
| 4,936,336 A | * | 6/1990 | McCauley et al. | 137/296 |
| 5,383,495 A | * | 1/1995 | Kennedy | 137/296 |
| 5,469,724 A | * | 11/1995 | Pollard | 137/296 |
| 6,463,953 B1 | * | 10/2002 | Cuzzo et al. | 137/296 |

* cited by examiner

*Primary Examiner*—George L. Walton
(74) *Attorney, Agent, or Firm*—Troutman Sanders LLP; Gerald R. Boss

(57) ABSTRACT

The present invention provides a hydrant locking device to be used in conjunction with a fire hydrant having locking nuts which includes, a base arm having a first base arm portion and a second base arm portion. A top arm extends upwardly from the base arm and includes a top arm cap for covering at least one of the locking nuts. The first base arm portion is detachably secured to the second base arm portion, wherein the base arm and the top arm are secured to the fire hydrant when the first base arm portion is secured to the second base arm portion.

13 Claims, 5 Drawing Sheets

US 6,691,732 B2

HYDRANT SECURITY DEVICE

CROSS-REFERENCE TO RELATED APPLICATIONS

This application claims the benefit of provisional application No. 60/354,491 filed on Feb. 8, 2002.

FIELD OF THE INVENTION

The present invention relates to a fire hydrant security device that will prevent or at least alert authorities to unauthorized discharge of water or other fluids from a hydrant such as are typically installed in municipal water distribution systems for providing ready access to a source of water under pressure for fire departments and street cleaning and the like.

BACKGROUND OF THE INVENTION

In some jurisdictions, it has been conventional to secure fire hydrants or other water discharge outlets against unauthorized use. These jurisdictions have generally been limited to large urban areas. Recently, however, it has become apparent to even small jurisdictions having authority over municipal water distribution systems that security must be provided for water outlets such as hydrants or nozzles that are typically not subject to supervision by police or other security personnel. This is due in large part to increases in vandalism by unsupervised youth as well as the danger of terrorist attacks, including, for example, flooding of an area such as an underground garage or even poisoning of a water system.

In the past, in constructing security devices for fluid outlets, ease-of-use and a high level of security have often competed and have led to compromises in the design of the devices. For fire departments, it is highly desirable that the device be easily removed when it is necessary to obtain water to quench a fire in a building. For a municipal water system, it is highly desirable that a high level of security be achieved so that not only casual pranksters but determined attackers are discouraged and prevented from the illegal use of hydrant and the like. Previous attempts to produce a device that adequately addresses both the access and security needs have failed to produce a cost-effective solution. The present invention provides a novel cost-effective solution.

SUMMARY OF THE INVENTION

The present invention provides a hydrant locking device to be used in conjunction with a fire hydrant having locking nuts which includes, a base arm having a first base arm portion and a second base arm portion. A top arm extends upwardly from the base arm and includes a top arm cap for covering at least one of the locking nuts. The first base arm portion is detachably secured to the second base arm portion, wherein the base arm and the top arm are secured to the fire hydrant when the first base arm portion is secured to the second base arm portion.

DETAILED DESCRIPTION OF THE INVENTION

Figure 1:
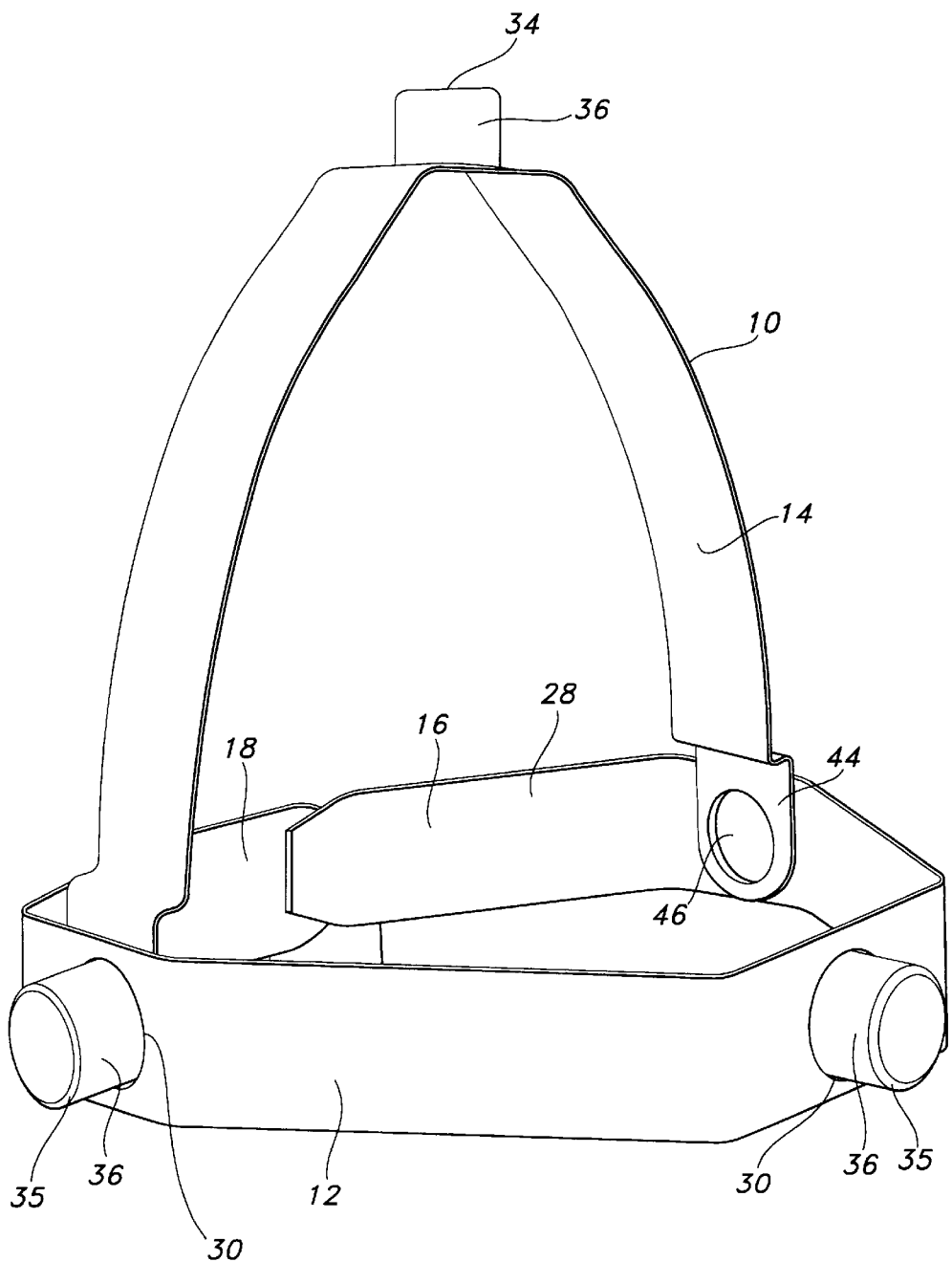
FIG. 1 is a rear perspective view of the locking device of the present invention before installation on a hydrant.
Figure 2:
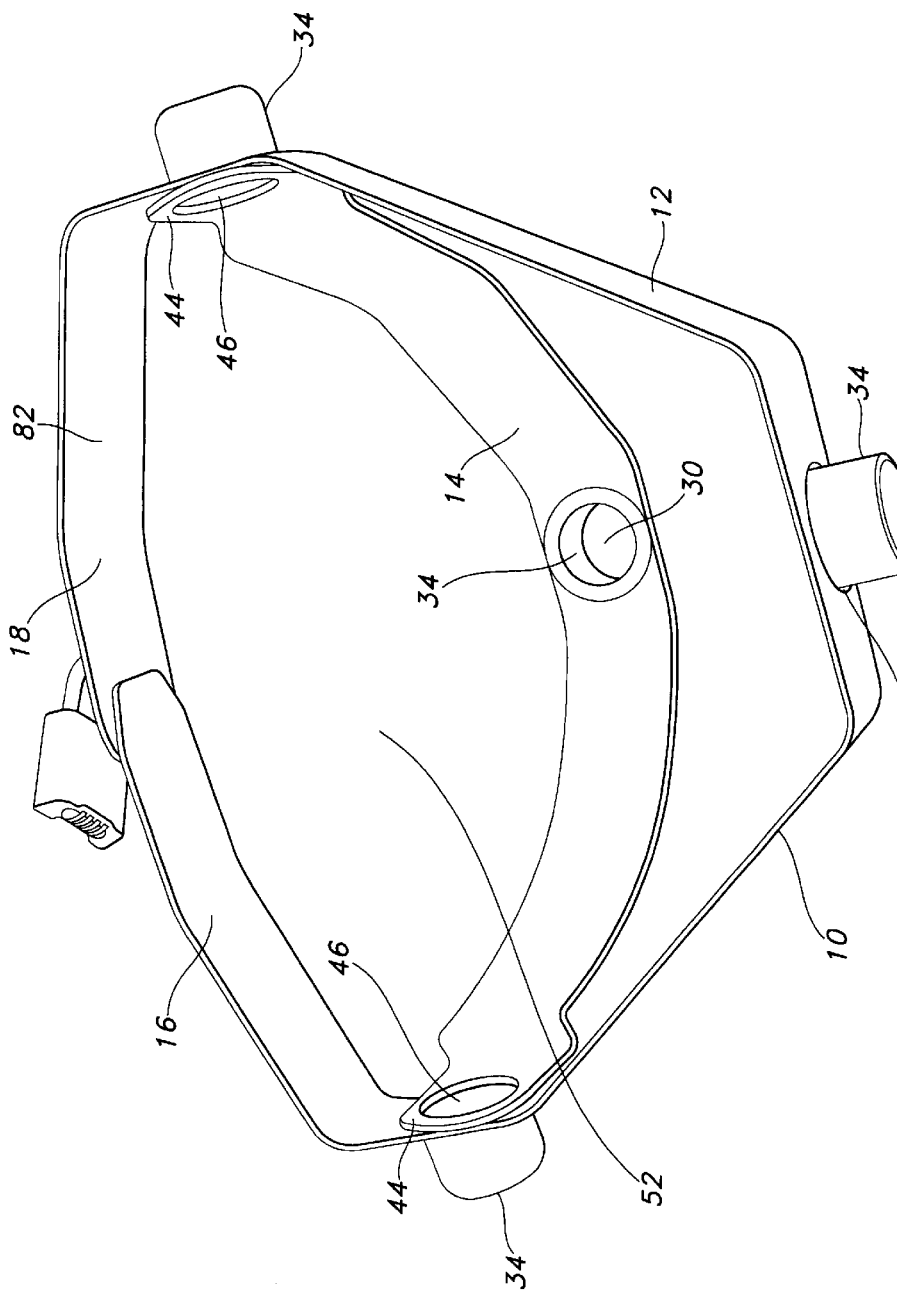
FIG. 2 is a perspective view from the bottom as viewed in FIG. 1.
Figure 3:
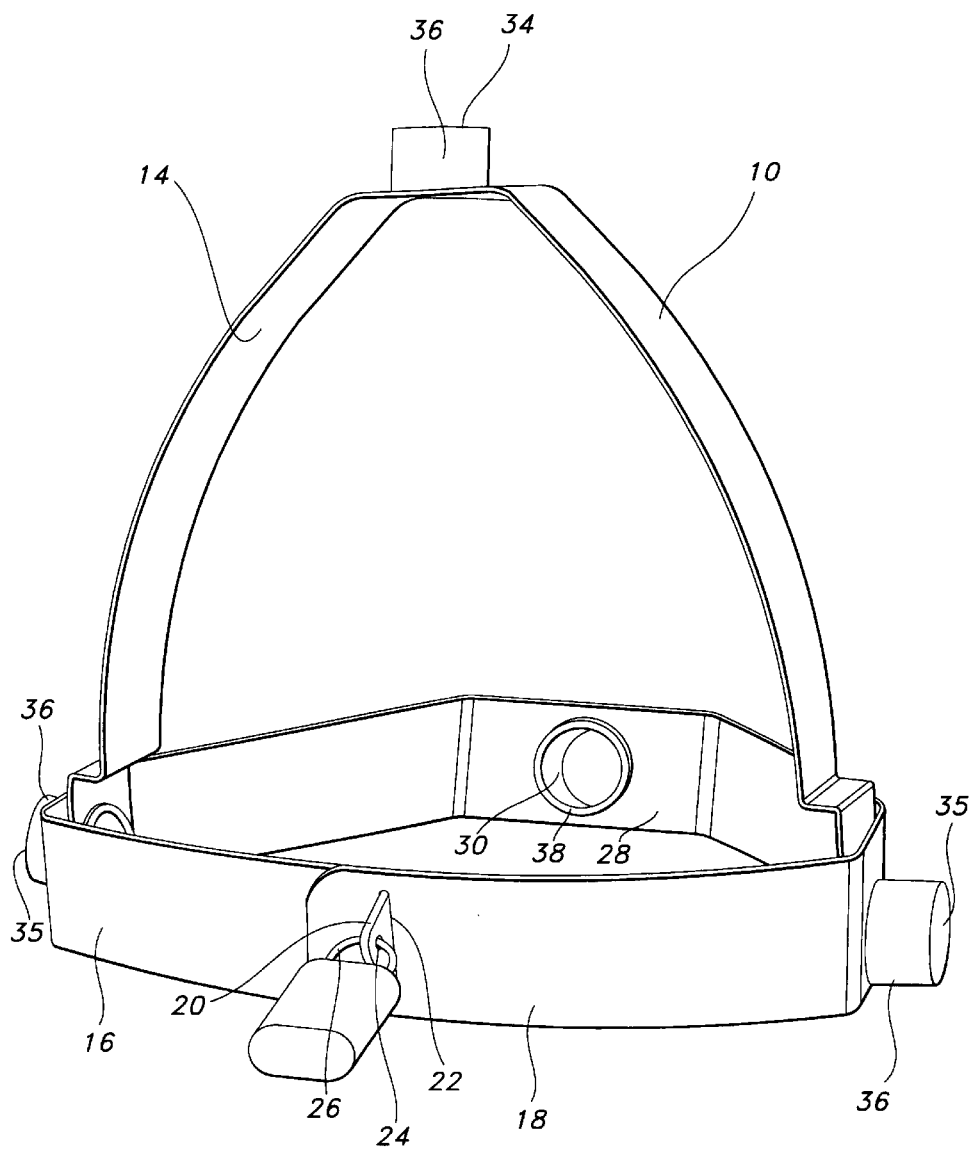
FIG. 3 is a perspective view of the locking device as viewed in FIG. 1.

Referring to FIGS. 1, 2, and 3, there is shown a hydrant locking device 10 of the present invention to be used in conjunction with a fire hydrant having locking nuts found on the caps 40 of the fire hydrant which includes a base arm 12 having a first base arm portion 16 and a second base arm portion 18 and a top arm 14 extending upwardly from the base arm 12. The top arm 14 includes a top arm cap 34 for covering at least one of the locking nuts. The first base arm portion 16 is detachably secured to the second base arm portion 18, wherein the base arm 12 and the top arm 14 are secured to the fire hydrant when the first base arm portion 16 is secured to the second base arm portion 18.

In one embodiment, the first base arm portion 16 has a tongue member 20 extending generally transverse to the face of the first base arm portion 16 and which is insertable through a slot 22 formed in the end of the arm portion 18. The tongue 20 has an opening 24 to receive a locking bar or arm 26 of any conventional lock construction but one which should be sufficiently robust to provide a high level of security. The base arm 12 includes a rear portion 28 and, as will be apparent from the drawing, the arm 12 is made from a single piece of flat material such as steel or hardened steel or similar material. The base arm 12 will be shaped to fit around a conventional hydrant and will permit the user to insert the tongue 20 through the opening 22 in the arm portion 18.

In another embodiment, to secure the hydrant against unauthorized use, the base arm 12 will have a number of apertures 30 formed therein at spaced apart locations as shown in the drawings, the number corresponding to the caps provided on the hydrant to be secured. The spanning arm 14 will also have an aperture 30, preferably at its apex. Each of the apertures 30 will receive a cap 34, 35 of substantially identical dimensions to allow the cap to be fitted over a locking nut found on the caps 40 of a hydrant. Preferably each of the caps 34, 35 will have a smooth cylindrical sidewall 36 to make it difficult for a tool to securely engage a cap 34, 35 if an attempt is made to destroy the locking device 10. Further, in this regard, each of the caps 34, 35 should have a dimension so that it is easily rotated in its associated opening 30 should a person attempt to open the locking device 10. To facilitate this, the base of the caps 34, 35 as shown in FIG. 3 are held in position in its associated opening by a flange 38 which may be coated on its side facing the surface of the arm 14 to facilitate rotation in the event a person applies a tool to the sidewall of the respective cap 34, 35. The caps 35 on the opposite sides of the base arm 12 can be securely welded to plates 44 provided at the opposite ends of the spanning arm 14. Alternately, the sidewall 36 of the caps 34, 35 may be frangibly mounted or coupled to the opening 46 provided in the plates 44 so that upon unauthorized engagement with a cap 34, 35, the coupling will yield allowing the cap 34, 35 to rotate freely in its associated apertures 30 and 46. As described, the spanning arm 14 can be pivoted about the caps 35 relative to the base arm 12 to facilitate installation and removal of the locking device 10 by an authorized user.

Figure 4:
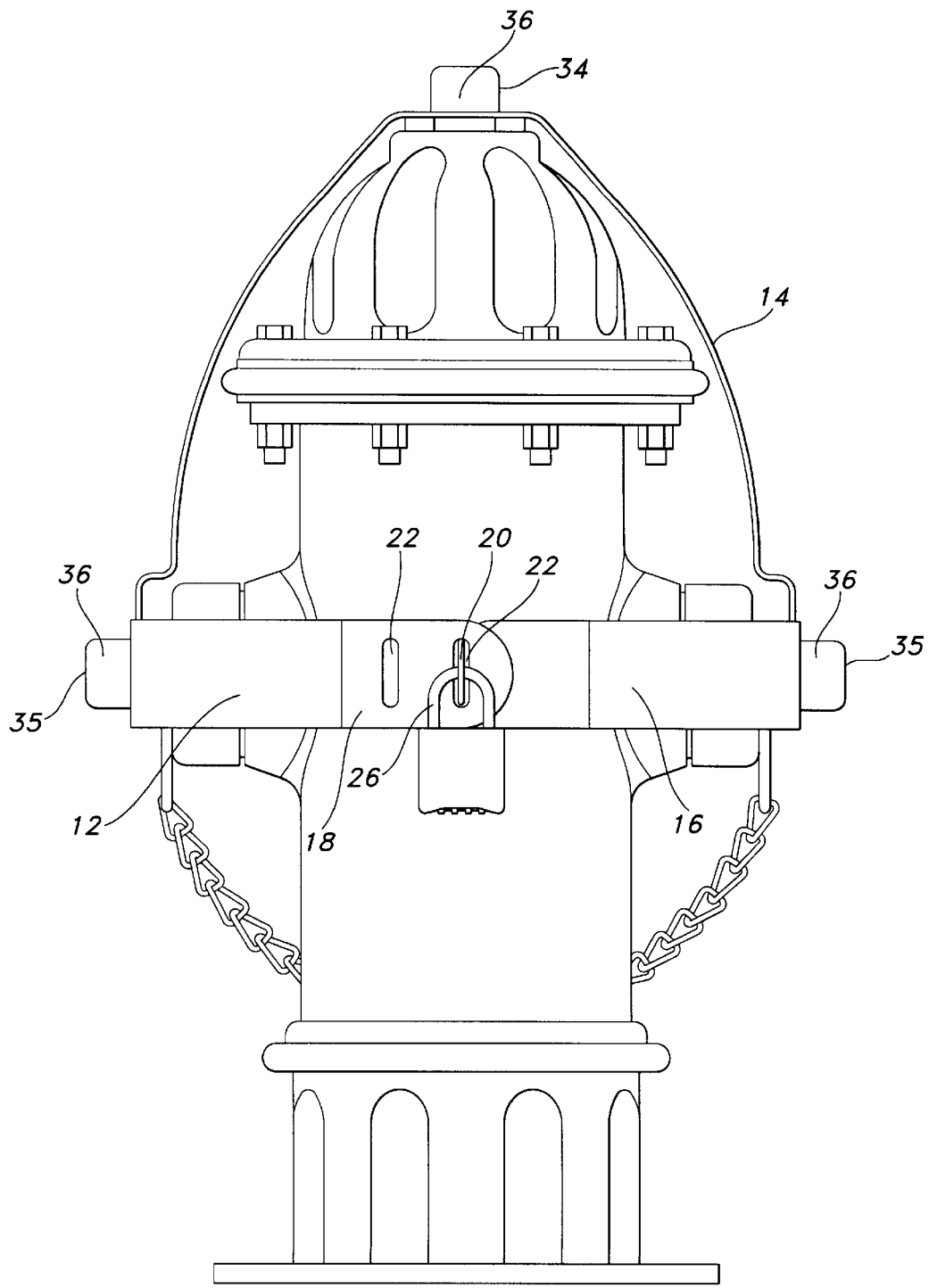
FIGS. 4 is front elevational view of the locking device of the present invention installed on a typical hydrant.

In FIG. 4, the locking device 10 is shown installed on a hydrant 42 with each of the locking nuts of the hydrant caps 40 covered by a cap 34, 35. In another embodiment, to facilitate accommodation of slight variations in the size of a hydrant, several apertures 22 may be provided in the end of the arm portion 16.

Figure 5:
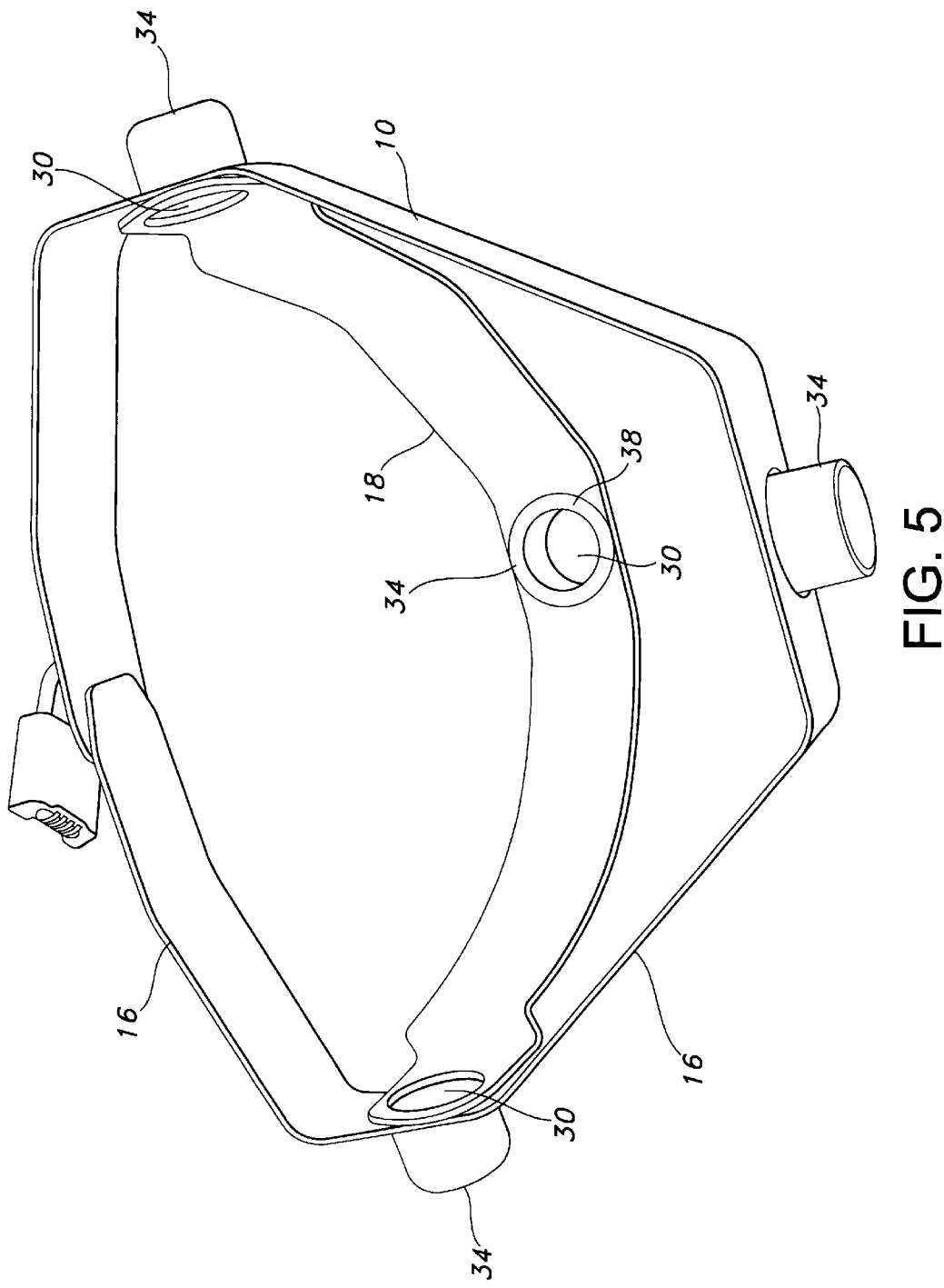
FIG. 5 is a perspective view from the bottom of an alternative embodiment of the present invention.

In a further embodiment illustrated in FIG. 5, the hydrant locking device 10 to be used in conjunction with a fire hydrant having locking nuts would comprise of a base 50 having two arms 16, 18 which define a hole 52 for receiving the fire hydrant. The arms 16, 18 have at least one aperture 30 for receiving a cap 34 to cover at least one of the locking nuts, the cap 34 being capable of rotation around the locking nut. In one embodiment, the cap 34 is capable of rotation around the locking nut because the cap 34 is not permanently affixed to the arms 16, 18. The cap 34 is held in position in the aperture 30 by a flange 38 which allows the cap 34 to rotate freely while still maintaining its position in the aperture 30.

In at least one embodiment of the above described provides a novel cost-effective means for securing a fire hydrant. This invention provides an apparatus that secures a fire hydrant by preventing undesired access to the locking nuts of a hydrant. The locking device has one arm that wraps around hydrant where the two parts of the arm are connected by a conventional locking device. A second arm, which is generally perpendicular to the first arm, creates a harness that can fit over a conventional hydrant. The harness is held in place by the caps that fit over the locking nuts of the hydrant and the locking device that holds the two parts of the arm that wraps around the hydrant. Because it is possible for only one type of lock to be put on a series of hydrants, the locking device is easily removed by those with the key to the locking device. For example, a fire department would therefore be able to have one key that would open the lock for every fire hydrant that they use. Because this invention does not require the use of an expensive specialty lock, the cost of the locking device is minimized. Therefore, the present invention provides a cost-effective locking device that provides security to prevent that unauthorized use of a hydrant while still being easily removable by authorized users.

Having described the invention, it will be apparent that various modifications may be made thereto without departing from the spirit and scope of this invention.

What is claimed is:

1. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for encapsulating at least one of said locking nuts wherein said top arm cap rotates around at least one of said locking nuts;
    said first base arm portion being detachably secured to said second base arm portion; and
    wherein said base arm and said top arm are secured to the fire hydrant when said first base arm portion is secured to said second base arm portion.

2. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for covering at least one of said locking nuts;
    said first base arm portion being detachably secured to said second base arm portion;
    wherein said base arm and said top arm are secured to the fire hydrant when said first base arm portion is secured to said second base arm portion; and
    wherein said base arm includes at least one base arm cap for covering at least one of said locking nuts.

3. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for covering at least one of said locking nuts;
    said first base arm portion being detachably secured to said second base arm portion
    wherein said base arm and said top arm are secured to the fire hydrant when said first base arm portion is secured to said second base arm portion; and
    wherein said first base arm portion has a tongue member having an aperture to receive a lock and said second arm portion has an aperture for receiving said tongue member.

4. The hydrant locking device of claim 3 wherein said second arm portion has more than one aperture for receiving said tongue member.

5. The hydrant locking device of claim 2 wherein said top arm cap and said base arm caps rotate freely.

6. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for covering at least one of said locking nuts;
    said first base arm portion being detachably secured to said second base arm portion;
    wherein said base arm and said top arm are secured to the fire hydrant when said first base arm portion is secured to said second base arm portion; and
    wherein said base arm includes at least one base arm cap for covering at least one of said locking nuts; and
    wherein at least one of said top arm caps and base arm caps include a flange.

7. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for covering at least one of said locking nuts;
    said first base arm portion being detachably secured to said second base arm portion;
    wherein said base arm and said top arm are secured to the fire hydrant when said first base arm portion is secured to said second base arm portion; and
    wherein said top arm cap is frangibly mounted to said top arm.

8. A hydrant locking device to be used in conjunction with a fire hydrant having locking nuts comprising,
    a base arm having a first base arm portion and a second base arm portion;
    a top arm extending upwardly from said base arm;
    said top arm including a top arm cap for covering at least one of said locking nuts;

said first base arm portion being detachably secured to said second base arm portion;

wherein said base arm and said top arm are secured to the fire hydrant when said first base arm portion is secured to said second base arm portion;

wherein said base arm includes at least one base arm cap for covering at least one of said locking nuts; and wherein at least one of said base arm caps is frangibly mounted to said base arm.

9. A hydrant locking device to be used in conjunction with a fire hydrant having a plurality of locking nuts comprising, a base arm having a first base arm portion and a second base arm portion;

said base arm including a base arm cap for covering at least one of said plurality of locking nuts;

a top arm extending upwardly from said base arm;

said top arm including a top arm cap for covering at least one of said plurality of locking nuts;

said first base arm portion being detachably secured to said second base arm portion;

wherein said base arm and said top arm are secured to the fire hydrant when said first base arm portion is secured to said second base arm portion; and wherein said top arm is capable of pivoting about said base arm cap.

10. A hydrant locking device to be used in conjunction with a fire hydrant having locking nuts comprising, a base having two arms which define a hole for receiving said fire hydrant, said arms having at least one aperture for receiving a cap to cover one of said locking nuts, said cap being capable of rotation around said locking nut.

11. The hydrant locking device of claim 10 where said first base arm portion has a tongue member having an aperture to receive a lock and said second arm portion has an aperture for receiving said tongue member.

12. The hydrant locking device of claim 11 where said second arm has more than one aperture for receiving said tongue member.

13. A hydrant locking device to be used in conjunction with a fire hydrant having locking nuts comprising, a base arm having a first base arm portion and a second base arm portion, said base arm including at least one base arm cap for covering at least one of said locking nuts;

a top arm extending upwardly from said base arm;

said top arm including a top arm cap for covering at least one of said locking nuts;

said first base arm portion being detachably secured to said second base arm portion, said first base arm portion having a tongue member having an aperture to receive a lock and said second arm portion having at least one aperture for receiving said tongue member; and wherein said base arm and said top arm are secured to the fire hydrant when said first base arm portion is secured to said second base arm portion.

* * * * *

UNITED STATES PATENT AND TRADEMARK OFFICE
CERTIFICATE OF CORRECTION

PATENT NO.    : 6,691,732 B2                                            Page 1 of 1
DATED         : February 17, 2004
INVENTOR(S)   : Fleury et al.

It is certified that error appears in the above-identified patent and that said Letters Patent is hereby corrected as shown below:

<u>Title page,</u>
Item [75], Inventors, the second inventor should read -- Mikhail German, Johnston, RI (US); --

Signed and Sealed this

Eighteenth Day of May, 2004

JON W. DUDAS
*Acting Director of the United States Patent and Trademark Office*